United States Patent
Rozenberg et al.

(10) Patent No.: US 11,443,074 B2
(45) Date of Patent: Sep. 13, 2022

(54) VERIFICATION OF PROGRAMMABLE LOGIC DEVICES

(71) Applicant: HEWLETT PACKARD ENTERPRISE DEVELOPMENT LP, Houston, TX (US)

(72) Inventors: Gennadiy Rozenberg, Houston, TX (US); Naysen Robertson, Roseville, CA (US); Jhovel Louie Lopez, Roseville, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 237 days.

(21) Appl. No.: 16/844,053

(22) Filed: Apr. 9, 2020

(65) Prior Publication Data
US 2021/0319141 A1 Oct. 14, 2021

(51) Int. Cl.
*H04L 9/32* (2006.01)
*G06F 11/22* (2006.01)
(Continued)

(52) U.S. Cl.
CPC .............. *G06F 21/76* (2013.01); *G06F 21/44* (2013.01); *H03K 19/1776* (2013.01); *H03K 19/17728* (2013.01); *H04L 9/3247* (2013.01)

(58) Field of Classification Search
CPC .. G06F 21/76; G06F 21/44; G06F 2221/2129; H03K 19/17728; H03K 19/1776; H04L 9/3247
See application file for complete search history.

(56) References Cited

U.S. PATENT DOCUMENTS 6,069,489 A 5/2000 Iwanczuk et al.
7,088,133 B2 8/2006 Lee et al.
(Continued)

OTHER PUBLICATIONS

Zachry, Firmware Modification Attacks on Programmable Logic Controller (Year: 2013).*

(Continued)

*Primary Examiner* — Vu V Tran
(74) *Attorney, Agent, or Firm* — Trop, Pruner & Hu, P.C.

(57) ABSTRACT

A data processing system comprises a management processor, a programmable logic device (PLD) coupled to the management processor, and a machine-readable medium (MRM). The MRM comprises a PLD configuration image to configure the PLD with image-defined logic that comprises self-verification logic and an image-defined management interface to enable the management processor to communicate with the self-verification logic. The MRM also comprises a cryptographic signature based on the PLD configuration image. The MR also comprises PLD authentication instructions which, when executed by the management processor, cause the management processor to retrieve an address for the PLD configuration image from the PLD via the management interface, use the address to retrieve the PLD configuration image from the PLD via the management interface, retrieve the cryptographic signature from the PLD via the management interface, and use the cryptographic signature and a cryptographic key of a trusted entity to authenticate the PLD configuration image.

12 Claims, 7 Drawing Sheets

(51) Int. Cl.
*G06F 15/78* (2006.01)
*G06F 21/76* (2013.01)
*H03K 19/17728* (2020.01)
*G06F 21/44* (2013.01)
*H03K 19/1776* (2020.01)

(56) References Cited

U.S. PATENT DOCUMENTS

| | | | |
|---|---|---|---|
| 7,759,968 | B1 | 7/2010 | Hussein et al. |
| 9,436,848 | B2 | 9/2016 | Beitel et al. |
| 10,417,078 | B2 | 9/2019 | McLaury et al. |
| 11,216,591 | B1* | 1/2022 | Burton .................... G06F 21/64 |
| 2010/0125739 | A1* | 5/2010 | Creary .................. H04L 9/3236 |
| | | | 713/189 |
| 2017/0090909 | A1* | 3/2017 | Guo ...................... G06F 21/575 |
| 2017/0293518 | A1* | 10/2017 | McLaury ............... G06F 11/079 |
| 2020/0342112 | A1* | 10/2020 | Plusquellic .......... H03K 3/0315 |
| 2020/0394337 | A1* | 12/2020 | Marinet ................. G06F 9/4498 |
| 2021/0081536 | A1* | 3/2021 | Zhang ................... H04L 9/3252 |
| 2021/0124711 | A1* | 4/2021 | Ansari ................. G06F 15/7882 |
| 2021/0256164 | A1* | 8/2021 | Loisel ..................... G06F 21/44 |

OTHER PUBLICATIONS

National Aeronautics and Space Administration (NASA), "Programmable Logic Devices (PLD) Handbook", Dec. 2, 2013, pp. 1-116.
NASA, "Programmable Logic Devices (PLD) Handbook," Dec. 2, 2013, pp. 1-116.

* cited by examiner

Machine-Readable Medium 610

PLD Configuration Image 590

To configure a PLD of a data processing system with image-defined logic that comprises an image-defined management interface, the image-defined management interface to enable a management processor in the data processing system to communicate with the image-defined logic in the PLD Wherein the image-defined logic comprises self-verification logic to enable the management processor to utilize the image-defined management interface of the PLD to retrieve from the PLD:
- an address for the PLD configuration image;
- the PLD configuration image; and
- the cryptographic signature

Cryptographic Signature 592

Based on PLD Configuration Image

FIG. 6

Machine-Readable Medium 710

Instructions 720

Upon execution, the instructions cause a management processor of a data processing system to:

- utilize an image-defined management interface of a PLD in the data processing system to retrieve an address for a PLD configuration image for the PLD, after the PLD has used the PLD configuration image to instantiate image-defined logic comprising self-verification logic and the image-defined management interface;
- utilize the image-defined management interface of the PLD to retrieve an address for a cryptographic signature from the PLD, wherein the cryptographic signature is based on the PLD configuration image;
- utilize the image-defined management interface and the address for the PLD configuration image to retrieve the PLD configuration image from the PLD;
- utilize the image-defined management interface and the address for the cryptographic signature to retrieve the cryptographic signature from the PLD; and
- utilize the cryptographic signature and a key of a trusted entity to authenticate the PLD configuration image.

FIG. 7

VERIFICATION OF PROGRAMMABLE LOGIC DEVICES

BACKGROUND

A data processing system (e.g., a server, a personal computer, a smartphone, etc.) may include components with configurable circuitry. Types of circuits which may be referred to as "configurable" or "programmable" include, for example, programmable logic array (PLA) circuits, programmable array logic (PAL) circuits, generic array logic (GAL) circuits, complex PLD (CPLD) circuits, field-programmable gate array (FPGA) circuits, etc. A component with configurable circuitry may also be referred to as a "programmable logic device" (PLD).

The data for programming or configuring a PLD may be referred to as a "configuration image." When a data processing system gets powered on, each PLD in the data processing system may automatically load its configuration image, thereby configuring the programmable portions of that PLD according to the predetermined configuration that is dictated or defined by the configuration image. However, one risk associated with using a PLD is that its configuration image might get corrupted.

To enhance security and reliability of a data processing system, PLDs in the data processing system can be verified. However, it may be challenging to verify PLDs in a manner that is fast, reliable, efficient, and immune from tampering. For instance, a PLD may include a standard interface (e.g., a Serial Peripheral Interface (SPI), an Inter-Integrated Circuit ($I^2C$) interface, a Joint Test Action Group (JTAG) interface, etc.), and a baseboard management controller (BMC) may use that standard interface to retrieve information from the PLD. However, a standard interface may be relatively slow, and it may be relatively easy for an attacker to intercept traffic from a standard interface. A standard interface may also be relatively inefficient, due to being relatively complex to implement, with a large number of signal wires involved, a complex communication protocol to support, etc.

DETAILED DESCRIPTION

As indicated above, it may be challenging to verify PLDs in a manner that is fast, reliable, efficient, and immune from tampering. Attributes such as speed, reliability, efficiency, and security may pertain to the verification process itself. They may also pertain to development efforts required to create a data processing system that is able to perform such a verification process.

Different electronic components may have different designs or models. For instance, the manufacturer of a data processing system that will include a PLD may choose to utilize a particular model of PLD over other PLD models. Different PLD models may use different mechanisms for accessing their respective configuration images and signatures. Likewise, if the data processing system is to include a management processor, the manufacturer may choose to utilize a particular model of management processor over other management processor models.

For purposes of this disclosure, the design or model of a data processing system includes the designs or models of the components to be included in that data processing system. The design or model of a data processing system may also be referred to as the "system design." For instance, one system design may use one model of PLD for a particular purpose, and a different system design may use a different model of PLD for that same purpose. Similarly, two system designs may differ in that one uses a particular model of management processor and the other uses a different model of management processor.

If a management processor that is capable of verifying a particular model of PLD is to be implemented as an application-specific integrated circuit (ASIC), significant engineering efforts may be consumed to create that ASIC design. And that design may not be suitable for verifying other types of PLDs. However, a manufacturer may desire to produce data processing systems with many different designs, including system designs that differ in the designs of PLDs used by those systems. Consequently, additional engineering efforts may be consumed to design a different management processor design for each different PLD design.

Similarly, if a management processor that is capable of verifying a particular model of PLD is to be implemented as a microcontroller, significant engineering efforts may be consumed to create the instructions which, when executed, will enable that microcontroller to verify the PLD. A microcontroller may contain a general-purpose processing core (or multiple general-purpose processing cores), along with various subsystems. The instructions to execute on that core (or those cores) may be referred to as "software," or more specifically as "firmware." A manufacturer may develop firmware that enables the microcontroller to operate as a management processor that is capable of verifying a PLD of a particular model. For instance, the firmware may instantiate a custom configuration that includes various parameters for the microcontroller's subsystems. The firmware may be developed for a particular system design. For example, the firmware may be tailored to configure the subsystems of the management processor for verifying PLDs of a particular model.

However, it may be challenging to develop good firmware for many different system designs. For example, the firmware to be executed by the management processor may be complex, and modifying the firmware for each different system design may introduce risks, introduce additional burdens, and increase the time for incorporating the management processor into the final system design.

This disclosure describes a method for effectively and efficiently verifying the configuration image of a PLD (or multiple PLDs) in a data processing system. In some examples, a data processing system includes a management processor and a PLD with a custom, image-defined management interface for communicating with the management processor. For instance, the management processor may be a BMC, and the PLD may be a CPLD.

As used herein, the term "BMC" refers to a specialized service processor that monitors the physical state of a computer system using sensors and communicates with a management system through an independent "out-of-band" connection. A "computer system" can refer to a server computer, a user computer, or any electronic device or collection of electronic devices. The BMC may also communicate with applications executing at the OS level through an input/output controller (IOCTL) interface driver, a Representational state transfer (REST) application program interface (API), or some other system software proxy that facilitates communication between the BMC and applications. The BMC may have hardware-level access to hardware components located in the computer system. The BMC may be able to directly modify the hardware components. The BMC may operate independently of the operating system (OS) of the computer system that the BMC is located in. The BMC may be located on the motherboard or main circuit board of the computer system to be monitored. The fact that a BMC is mounted on a motherboard of the managed computer system or otherwise connected or attached to the managed computer system does not prevent the BMC from being considered separate from a processing resource that executes the OS. A BMC has management capabilities to manage components of the computer system. Examples of management capabilities of the BMC can include any or some combination of the following: power control, thermal monitoring and control, fan control, system health monitoring, remote access of the computer system, remote reboot of the computer system, system setup and deployment, system security, and so forth.

In some examples, a BMC can provide so-called "lights-out" functionality for computing devices. The lights out functionality may allow a user such as a systems administrator to perform management operations on the computer system even if an OS is not installed or not functional on the computer system. Moreover, in some examples, the BMC can run on auxiliary power (e.g., battery power); as a result, the computer system does not have to be powered on to allow the BMC to perform its operations. The services provided by the BMC may be considered "out-of-band" services, since the OS may not be running and in some cases the computer system may be powered off or not functioning properly (e.g., the computer system has experienced a fault or hardware failure).

The BMC may include a communication interface, such as a network interface, and/or a serial interface that an administrator or other entity can use to remotely communicate with the BMC. An "out-of-band" service can be provided by the BMC via a dedicated management channel (e.g., the communication interface), and the "out-of-band" service can be available whether or not the computer system is in a powered on state.

In some examples, a data processing system also includes non-volatile machine-readable media. The machine-readable media contain a PLD configuration image to configure the PLD with image-defined logic. The image-defined logic comprises self-verification logic. The image-defined logic also comprises the image-defined management interface. The image-defined management interface enables the management processor to communicate with the self-verification logic in the PLD.

The machine-readable media also contain a cryptographic signature that was generated by a trusted entity (e.g., the manufacturer of the data processing system) based on the PLD configuration image and a cryptographic key (e.g., a private key) of the trusted entity. For purposes of this disclosure, the term "signature" denotes a cryptographic signature, and the term "key" denotes a cryptographic key. Also, a configuration image for a PLD may also be referred to as a "configuration bitstream," and a cryptographic signature may also be referred to as a "signature block."

The machine-readable media also include PLD authentication instructions (PAIs) to be executed by the management processor. When executed by the management processor, the PLD authentication instructions cause the management processor to retrieve an address for the PLD configuration image from the PLD via the image-defined management interface of the PLD. The PLD authentication instructions also cause the management processor to use the address for the PLD configuration image to retrieve the PLD configuration image from the PLD via the image-defined management interface of the PLD. The PLD authentication instructions also cause the management processor to retrieve the signature from the PLD via the image-defined management interface of the PLD. The PLD authentication instructions also cause the management processor to use the signature and a key of a trusted entity (e.g., a public key of the manufacturer of the data processing system) to authenticate the PLD configuration image. The management processor may thus verify that the PLD configuration image is an approved version of that image (e.g., an unmodified official version from the manufacturer). If the PLD configuration image has been compromised, the management processor may take remedial action.

In some examples, the configuration image of the PLD and the corresponding signature are stored in non-volatile storage (NVS) within the PLD. In other examples, the configuration image and the corresponding signature are stored in NVS that is external to the PLD. A manufacturer, for instance, may generate a signature as part of the build flow for a data processing system, after the configuration image has been generated. And if the manufacturer subsequently updates the configuration image, the manufacturer also updates the signature. Accordingly, the management processor in the data processing system may use cryptographic verification of the configuration image against the signature for attestation purposes, to verify that the configuration image is an unmodified official version of the configuration image from the manufacturer.

If the configuration image is not authentic, the management processor may take remedial measures. For instance, the management processor may disable the PLD, or the management processor may prevent a central processing unit (CPU) in the data processing system from reaching a working state as long as the PLD is compromised. Consequently, if an attacker has compromised the configuration image of a PLD (e.g., to disable security features), the management processor will prevent the data processing system from using that PLD.

The management processor may use a verification process that is fast, secure, flexible, and independent of the vendor and device model of the PLD.

As described in greater detail below, in some examples, the management processor retrieves the PLD configuration image from the PLD one at a time. The management processor may also retrieve the corresponding signature from the PLD one page at a time. For purposes of this disclosure, the term "page" refers to a block of data of a particular size. In some examples, the management processor retrieves the PLD configuration image and the signature using a page size of 16 bytes. In different examples, the size of a page may be smaller or larger.

Figure 1:
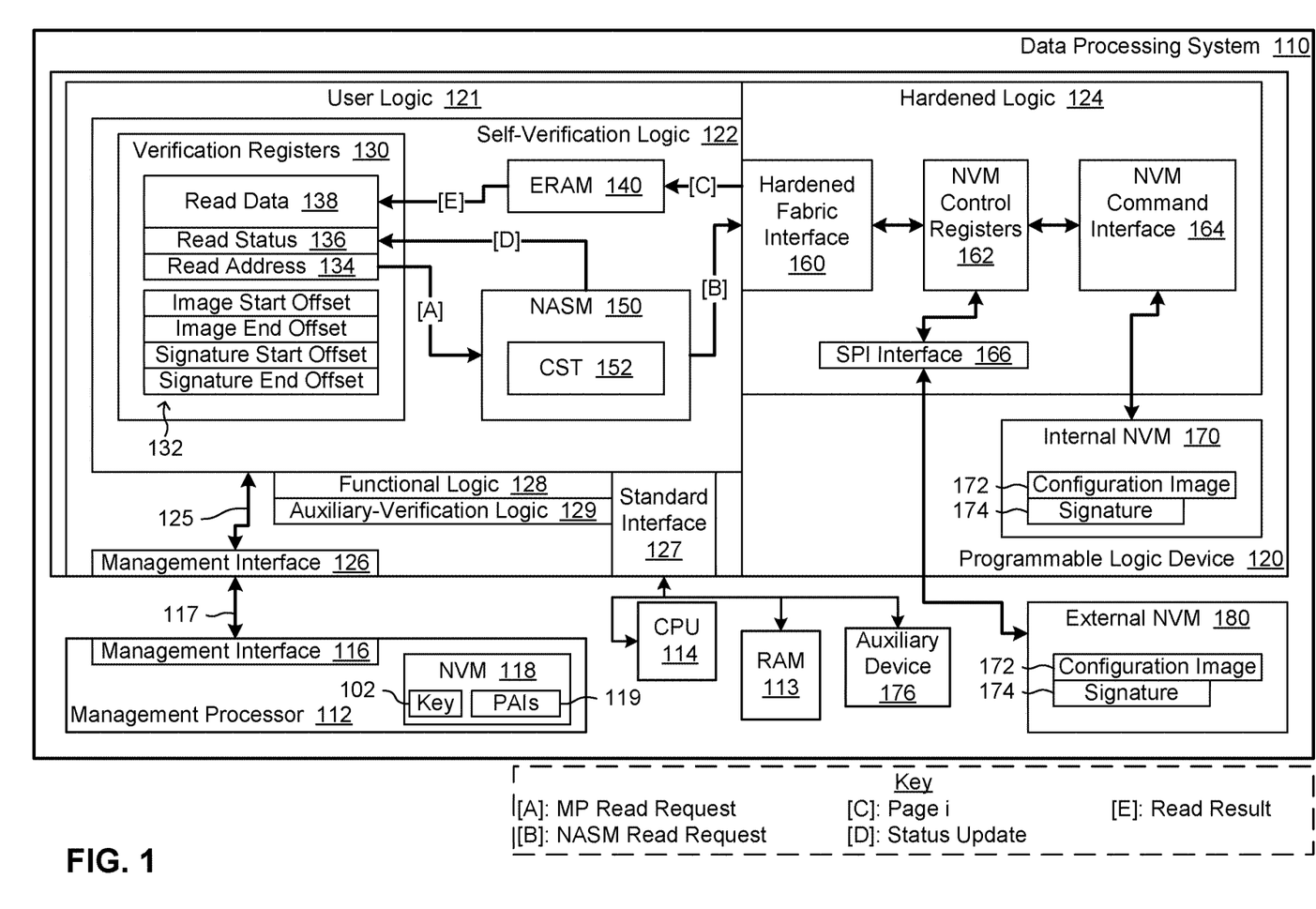
FIG. 1 is a block diagram of a data processing system with technology for PLD verification according to an example implementation.

FIG. 1 is a block diagram of a data processing system 110 with technology for PLD verification according to an example system design. FIG. 1 depicts a specific example architecture for data processing system 110, although other examples of data processing systems may have architectures that vary from what is shown in FIG. 1 in accordance with other implementations. For instance, in some examples, a data processing system may include multiple CPUs, etc. For the implementation that is depicted in FIG. 1, data processing system 110 includes a CPU 114 connected to random access memory (RAM) 113. In addition, data processing system 110 includes a PLD 120 and a management processor 112 that is connected to PLD 120 via a management interconnection 117. Management interconnection 117 may also be referred to as a management bus. in some examples, management interconnection 117 is a custom, high-speed, source synchronous interconnect.

PLD 120 includes hardened logic 124, which is circuitry that does not change from boot to boot. When data processing system 110 boots up, PLD 120 retrieves a configuration image 172 from NVS in the data processing system, and PLD 120 creates user logic 121 within PLD 120, based on that configuration image. Since the user logic in a PLD is configured, programmed, or defined according to the configuration image for that PLD, user logic may also be referred to as "image-defined logic." In some embodiments, configuration image 172 is stored in PLD 120 in internal non-volatile memory (NVM) 170. In some embodiments, configuration image 172 is stored outside of PLD 120 in external NVM 180. NVM 170 or NVM 180 may also contain a signature 174 that corresponds to configuration image 172. In some examples, hardened logic 124 uses an SPI interface 166 to access external NVM 180.

User logic 121 may include functional logic 128. Management processor 112 may use functional logic 128 to communicate with other components of data processing system 110 (e.g., with CPU 114, RAM 113, and auxiliary device 176). For instance, management processor 112 may use functional logic 128 to monitor and adjust a power state of CPU 114.

User logic 121 may also include self-verification logic 122, auxiliary-verification logic 129, and a management interface 126. Since management interface 126 is defined by configuration image 172, management interface 126 may also be referred to as an "image-defined management interface." Likewise, the other components within user logic 121 may also be referred to as "image-defined." Management interface 126 enables management processor 112 to communicate with components of PLD 120 such as self-verification logic 122.

In some examples, management processor 112 is a microcontroller, a system on a chip (SoC), an embedded processor, or any other suitable type of processor. In some examples, management processor 112 serves as a BMC. In some embodiments, PLD 120 is a CPLD. Management interface 126 may also be referred to as a "CPLD Interface" (CIF). Accordingly, management interconnection 117 may also be referred to as a "CIF interconnection" or a "CIF bus."

Management processor 112 may verify configuration image 172 by accessing configuration image 172 and signature 174 through a set of verification registers 130 of PLD 120 that are exposed over management interconnection 117. Verification registers 130 may be part of self-verification logic 122. Additional circuitry in self-verification logic 122 to enable management processor 112 to obtain configuration image 172 and signature 174 from PLD 120, includes embedded RAM (ERAM) 140 and a state machine 150 for accessing NVS associated with PLD, such as internal NVM 170 or external NVM 180. Accordingly, state machine 150 may also be referred to as NVS access state machine (NASM) 150. NASM 150 includes a command sequence table (CST) 152. NASM 150 uses CST 152 to cause hardened logic 124 to load a portion of configuration image 172 starting at a specified address into ERAM 140. NASM 150 is able to do so because NASM 150 is configured with logic (including CST 152) that is suitable for interacting with the particular hardened fabric interface 160 that enables components within hardened logic 124 to communicate or interact with components in user logic 121.

Self-verification logic 122 enables management processor 112 to obtain data from PLD 120 by specifying the address of that data in a read request from management processor 112. A read request from management processor (MP) 112 may also be referred to as an "MP read request." In addition, self-verification logic 122 enables management processor 112 to obtain the start address of configuration image 172 and the end address (or size) of configuration image 172 from PLD 120. Self-verification logic 122 also enables management processor 112 to obtain the start address and the end address (or size) of signature 174 from PLD 120.

In particular, in the example of FIG. 1, verification registers 130 include a subset of registers that contain the start offset of configuration image 172, the end offset of configuration image 172, the start offset of signature 174, and the end offset of signature 174. That subset of registers may be referred to as the "image/signature address registers" 132. Self-verification logic 122 allows management processor 112 to read those registers via management interface 126. As illustrated, verification registers 130 also include a read address register 134, a read status register 136, and a read data register 138.

In some embodiments, distinct registers may be used for distinct type of values. In some examples, a single register may be partitioned to contain multiple types of values. For instance, read status register 136 may be implemented as a particular bit within a register. For purposes of this disclosure, the term "register" should be understood as referring to a complete register or to a specific portion of a register.

Self-verification logic 122 allows management processor to write to read address register 134 (via management interface 126), to specify the address of a page to be read from PLD 120. The operation of writing a desired address to read address register 134 may be considered to be the issuance of a read request. Self-verification logic 122 also allows management processor 112 to read from read status register 136, to determine when self-verification logic 122 has finished retrieving the desired page for management processor 112. Self-verification logic 122 also allows management processor 112 to write to read status register 136, to clear the read status before submitting a read request. Thus, the value in read status register 136 indicates whether or not the desired data is ready to be read by management processor 112. In other words, read status register 136 implements a flag that may be referred to as a "ready flag."

Read data register 138 contains or is linked to the data that has been read from hardened logic 124 by self-verification logic 122 in response to a read request from management processor 112. For instance, read data register 138 may be mapped to ERAM 140. Self-verification logic 122 allows management processor 112 to read from read status register 136 to determine when a read request is ready, and self-verification logic 122 allows management processor 112 to read from read data register 138 to obtain the desired data. Self-verification logic 122 also allows management processor 112 to write to read status register 136 before issuing a read request, to flag that request (or the corresponding read data) as being "not ready."

As shown in FIG. 1, management processor 112 may include NVM 118, and NVM 118 may include software 119 which, when executed by management processor 112, enables or causes management processor 112 to verify configuration image 172. Accordingly, software 119 may also be referred to as "PLD authentication instructions" (PAIs) 119. PLD authentication instructions 119 may be implemented as firmware, for instance. PLD authentication instructions 119 may also instantiate a custom configuration that includes various parameters for the microcontroller's subsystems. PLD authentication instructions 119, in conjunction with circuitry in management processor 112, may implement a management interface 116 that enables management processor 112 to communicate with PLD 120 via management interconnection 117. Also, as part of the authentication process, management processor 112 may retrieve signature 174 from PLD 120, and management processor 112 may use a cryptographic key 102 of a trusted entity to authenticate signature 174.

In some examples, key 102 and PLD authentication instructions 119 may reside in NVM that is external to management processor 112.

In some examples, the trusted entity that generates signature 174 may be the manufacturer of data processing system 110. In some examples, the manufacturer may use a cryptographic key (e.g., a private key) to generate signature 174 based on the configuration image, and the manufacturer may store a corresponding key 102 (e.g., a public key) in NVM 118 during the build process for data processing system 110.

As indicated above, NASM 150 includes logic (including CST 152) for accessing configuration image 172 and signature 174. In particular, NASM 150 and CST 152 are designed to operate in a particular PLD model. For example, hardened logic 124 may include a particular set of NVM control registers 162 and a particular NVM command interface 164, and CST 152 may be designed to use NVM control registers 162 and NVM command interface 164 to retrieve specified pages from hardened logic 124.

However, NASM 150 is image-defined, and CST 152 may be easily modified. Consequently, it may be easy to modify NASM 150 and CST 152 to operate in different PLD models. Also, since management interface 126 is image defined, it may be easy to create a configuration image that creates the same kind of management interface for different PLD models. Consequently, it may be relatively easy to configure different models of PLDs with interfaces that management processors may use for PLD verification according to the teachings herein.

Also, different system design may use different models of management processors to verify different models of PLDs. However, the PLD authentication instructions in each management processor may enable that management processor to interact with various models of PLDs according to the present teachings. For instance, each management processor may use the same kind of management interface and the same kind of PLD authentication instructions, in that those PLD authentication instructions implement the same kind of process as described herein.

Thus, the present disclosure describes a verification process that is flexible and independent of the vendor and device model of the PLD.

In addition, management processor 112 may access functional logic 128 and auxiliary-verification logic 129 via management interface 126. As indicated above, functional logic 128 may enable management processor 112 to communicate with other devices in data processing system 110. Auxiliary-verification logic 129 may enable processor to authenticate additional devices in data processing system 110, such as auxiliary device 176. In some embodiments, PLD 120 may communicate with auxiliary device 176, CPU 114, and RAM 113 via a standard interface 127. However, in some examples, the user logic may include multiple standard interfaces, to enable the PLD to communicate with different devices via different buses.

The verification process for PLD 120 may also be fast. For instance, PLD 120 may power up and configure user logic 121 according to configuration image 172 very quickly, thereby enabling management processor 112 to verify PLD 120. Also, the protocol used by management processor 112 for obtaining configuration image 172 and signature 174 from PLD 120 may allow for rapid transfer of that data to management processor 112.

Also, the verification process for PLD 120 may be secure, in that the mechanism or protocol for management processor 112 and PLD 120 to communicate with each other may not be well known. For instance, the manufacturer of data processing system 110 may keep various details of that protocol secret. Furthermore, management interface 116 and management interface 126 may use encryption to protect the information on management interconnection 117.

Development of management interface 116 and management interface 126 may also be efficient, in that those interfaces may use logic that has already been developed to enable a management processor to access registers in a PLD.

As indicated above, self-verification logic 122 may allow management processor 112 to read a page of data at a time by setting read address register 134, waiting for a data-ready bit (e.g., read status register 136) to be set, and then reading from read data register 138. in some examples, user logic 121 implements NASM 150, which is a finite-state machine (FSM) that accesses hardened logic 124 and reads the data from internal NVM 170 or from external NVM 180 using a series of commands that are stored in CST 152, which may be an internal PLD memory block. Those commands may be specific to the particular PLD model of PLD 120. In other words, the commands may be model-specific commands. For a different system model with a different model of PLD, the system manufacturer may easily change the CST to handle that model of PLD, while maintaining the same register set for the system's management processor.

The data that self-verification logic 122 reads from hardened logic 124 may be stored in RAM in PLD 120 (e.g., in ERAM 140) in order to reduce the use of logic resources.

Image/signature address registers 132 define the range of addresses from which the image and signature can be obtained. The values in those registers may easily be changed to allow for configuration images and signatures of different sizes. Management processor 112 may iterate across the range of addresses one page at a time to read the full image and the full signature.

Figure 2:
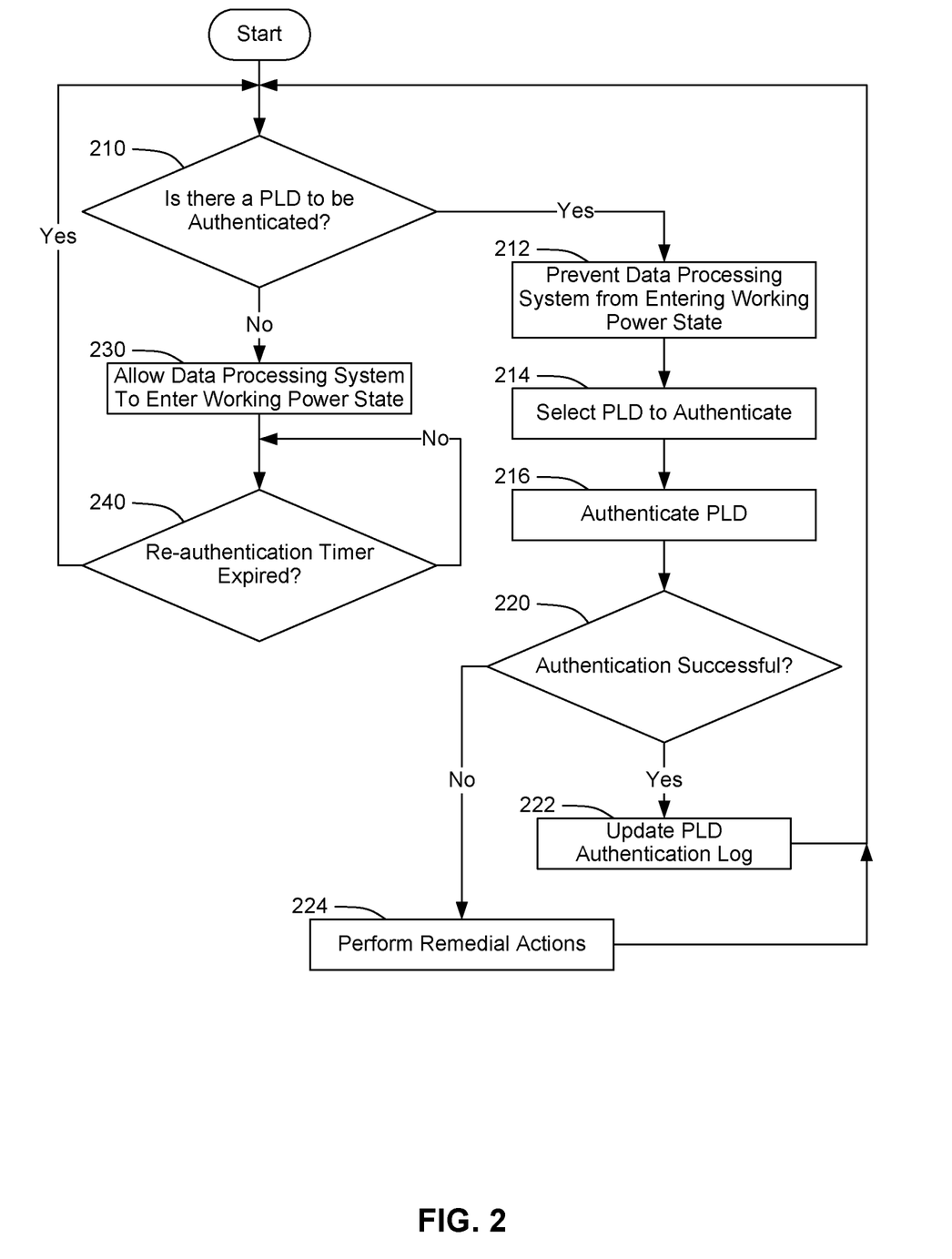
FIG. 2 is a flow diagram illustrating a process for verifying PLDs in a data processing system according to an example implementation.

FIG. 2 is a flow diagram illustrating a process for verifying PLDs in a data processing system according to an example implementation. The process starts with data processing system 110 being powered up, including management processor 112 and PLD 120. As shown at block 210, early in the boot process for data processing system 110, management processor 112 may determine whether there are any PLDs to be authenticated. For instance, management processor 112 may be configured to authenticate PLD 120. Alternatively, data processing system 110 may include multiple PLDs that are to be authenticated. For instance, auxiliary device 176 may also be a PLD, and management processor 112 may be configured to authenticate PLD 120 and auxiliary device 176.

Management processor 112 may perform PLD verification unobtrusively early upon application of power to data processing system 110, while data processing system 110 is in a power state of soft off or auxiliary power, such as the Advanced Configuration and Power Interface (ACPI) sleep state of S5, without significantly disrupting the standard operation of PLD 120. In some examples, management processor 112 verifies PLD 120 immediately after PLD 120 has loaded configuration image 172.

As described in greater detail below, if configuration image 172 fails verification, management processor 112 may flag the failure in an error message and attempt to update the configuration image to recover to a good state. Management processor 112 may prevent data processing system 110 from changing to a working power state (e.g., the ACPI sleep state of S0) until the verification issued is resolved, to prevent data processing system 110 from running in a compromised state.

Referring again to block 210, if there is a PLD to be authenticated, management processor 112 may then prevent data processing system 110 from entering a working state pending successful PLD verification, as shown at block 212. As shown at block 214, management processor 112 may then select a PLD to authenticate. For instance, in one example, management processor 112 is configured to authenticate one device: PLD 120. In another example, management processor 112 is configured to authenticate multiple PLDs (e.g., PLD 120 and auxiliary device 176). As shown at block 216, management processor 112 may then authenticate the selected PLD. Additional details for an example authentication process are provided below with regard to FIGS. 3 and 4.

As shown at block 220, management processor 112 may then determine whether authentication was successful. If authenticate was successful, management processor 112 may update an authenticate log, as shown at block 222, and the process may return to block 210. Management processor 112 may then determine whether there are any more PLDs to authenticate. If there is another PLD to authenticate, management processor 112 may repeat the operations described above to authenticate that PLD.

If there are no more PLDs to authenticate, the process may pass from block 210 to block 230. Management processor 112 may then allow data processing system 110 to enter a working power state.

In addition, management processor 112 may periodically reverify PLDs during data processing system 110 runtime, based on user policy selection, without interrupting the operation of the PLDs or requiring any downtime. For instance, as shown at block 240, re-authentication may be triggered by expiration of a PLD re-authenticate timer. In response, management processor 112 may determine at block 210 that there is a PLD to be authenticated. Management processor 112 may then re-authenticate PLD 120, or multiple PLDs. And any detected failures may trigger remedial measures.

Referring again to block 220, in response to authenticate failure of a PLD (e.g., PLD 120), management processor 112 may perform remedial actions to handle the authenticate failure. For example, management processor 112 may report the failure to the system user(s) with an error message, and management processor 112 may attempt to recover a good configuration image for that PLD. The remedial actions may also include updating the PLD authentication log with details concerning the authentication failure.

Block 216 of FIG. 2 pertains to authentication of a PLD by a management processor. Authentication of a PLD may involve some operations that are performed by the PLD and some that are performed by the management processor.

Figure 3:
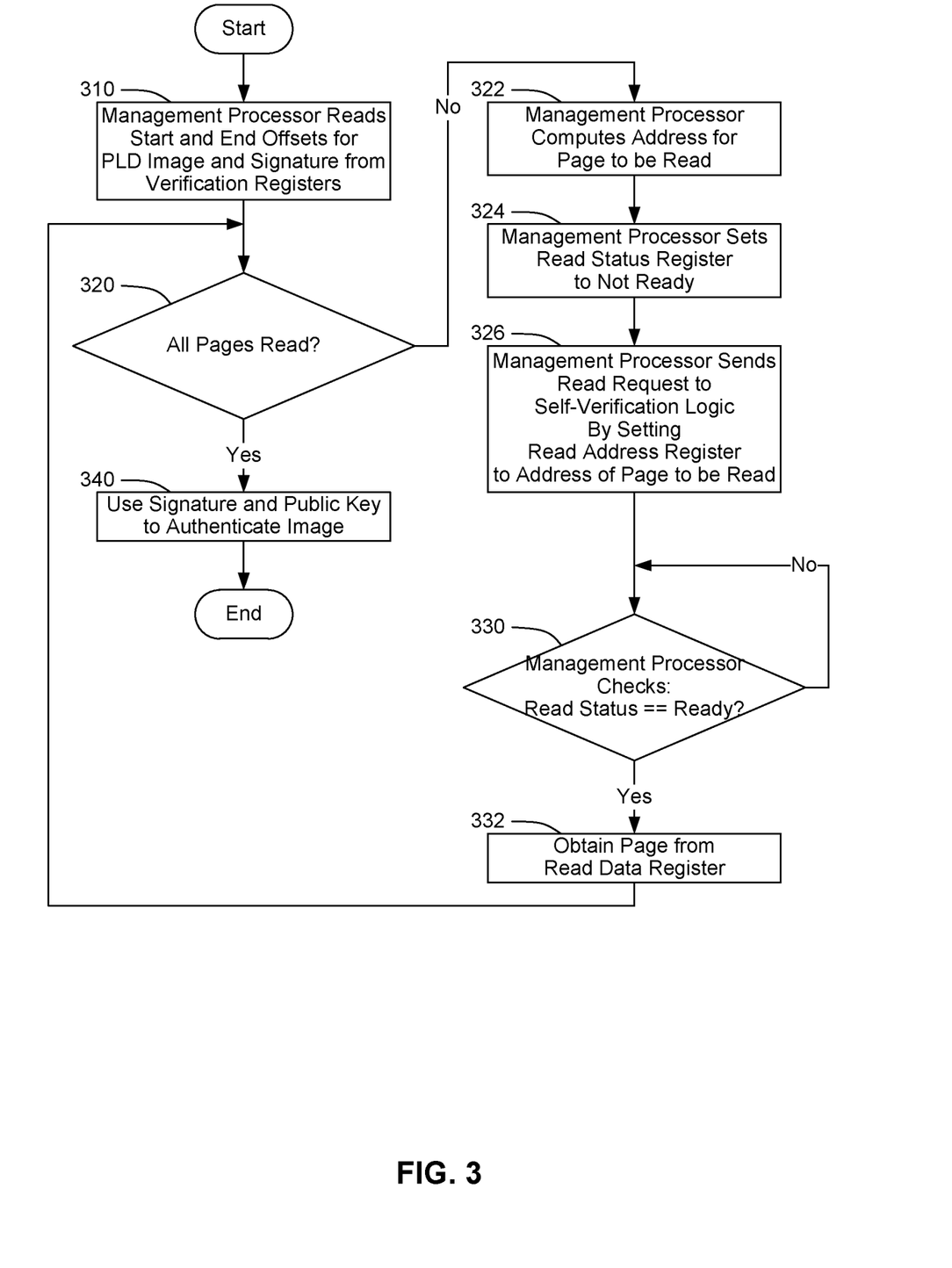
FIG. 3 is a flow diagram illustrating further details for the operation shown at block 216 of FIG. 2, with regard to operations performed by a management processor in the data processing system.

FIG. 3 is a flow diagram illustrating further details with regard to block 216 of FIG. 2, focused on operations performed by management processor 112. Those operations are described in connection with PLD 120. However, management processor 112 may use the same kind of process to authenticate other PLDs, such as auxiliary device 176.

As shown at block 310, that process may start with management processor 112 reading the start offset and the end offset for configuration image 172 and the start offset and the end offset for signature 174 from the image/signature address registers 132. Management processor 112 may then read configuration image 172 and signature 174 from PLD 120, one page at a time.

For example, as shown at block 320, management processor 112 may determine whether all pages of configuration image 172 and all pages of signature 174 have been read yet. If all pages have not yet been read, management processor 112 may compute the address for the next page to be read, as shown at block 322. For instance, to retrieve the first page of configuration image 172, management processor 112 may use the image start offset. And to retrieve subsequent pages, management processor 112 may add the page size to compute the address for the next page to be read. Also, as shown at block 324, management processor 112 may set read status register 136 to a value that indicates not ready. As shown at block, management processor 112 may then send a read request to self-verification logic 122 in PLD 120 by writing, to read address register 134, the address for the page to be read.

As shown at block 330, management processor 112 may then wait for self-verification logic 122 to update read status register 136 with a value to indicate that the requested data is ready. As shown at block 332, management processor 112 may then respond to a read status of ready by reading a page of data from read data register 138. As indicated above, read data register 138 may be mapped to ERAM 140. Accordingly, management processor 112 may obtain the desired page from ERAM 140 via read data register 138.

The process may then return to block 320, to be repeated for all pages of configuration image 172 and all pages of signature 174. Once management processor 112 has read all pages of configuration image 172 and signature 174, management processor 112 may then use signature 174 and key 102 to verify configuration image 172, as shown at block 340. For instance, as indicated above, in some examples, key 102 is a public key of a trusted entity, and signature 174 was generated by that trusted entity using a corresponding private key. Consequently, management processor 112 may use that public key to verify that configuration image 172 has not been corrupted, and to verify that configuration image 172 was signed by the trusted entity.

Figure 4:
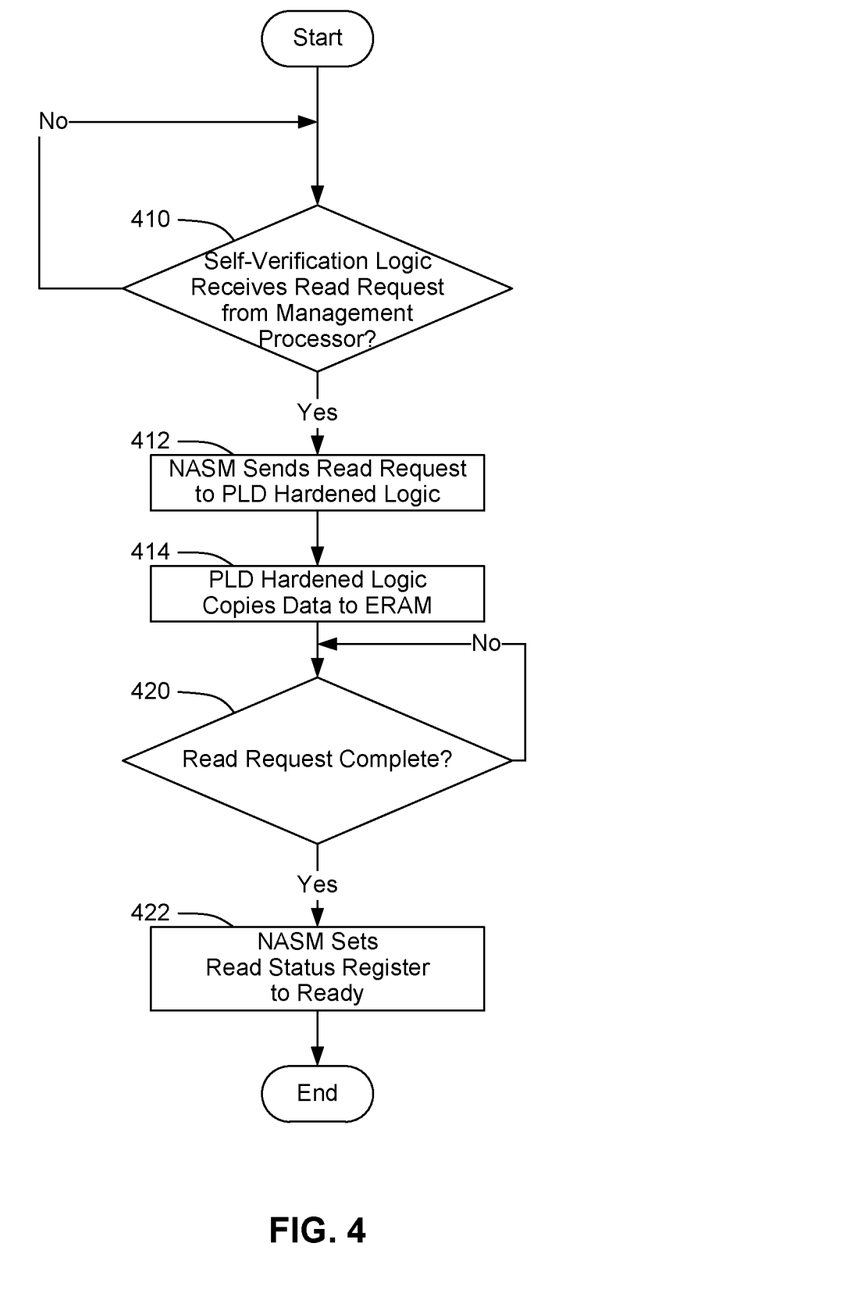
FIG. 4 is a flow diagram illustrating further details for the operation shown at block 216 of FIG. 2, with regard to operations performed by a PLD in the data processing system.

FIG. 4 is a flow diagram illustrating further details for the operation shown at block 216 of FIG. 2, with regard to operations performed by the PLD being authenticated. That process is described in connection with PLD 120. However, other PLDs (e.g., auxiliary device 176) may use the same kind of process. As shown at block 410, the process may start with self-verification logic 122 in PLD 120 waiting to receive a read request from management processor 112. Once management processor 112 sends a read request to self-verification logic 122 (e.g., by writing the address of the desired page to read address register 134), self-verification logic 122 may respond by using NASM 150 to send a corresponding read request to hardened logic 124, as shown at block 412. In FIG. 1, the arrows labeled [A] and [B] represent self-verification logic 122 using NASM 150 to send a read request to hardened logic 124 in response to management processor 112 writing the address for the desired page to read address register 134.

As shown at block 414, hardened logic 124 may then copy the specified page from internal NVM 170 or external NVM 180 to ERAM 140. In FIG. 1, the arrow labeled [C] represents hardened logic 124 copying the specified page to ERAM 140. As shown at block 420, self-verification logic 122 may wait for hardened logic 124 to indicate that it has completed the read request. Once hardened logic 124 has notified NASM 150 that it has completed the read request, NASM 150 may respond by updating read status register 136 to indicate that the data is ready, as shown at block 422. In FIG. 1, the arrow labeled [D] represents NASM updating read status register 136 to indicate that the requested data is ready. The process of FIG. 4 may then end.

Referring again to blocks 330 and 332 of FIG. 3, once self-verification logic 122 has updated read status register 136 to indicate that the data is ready, management processor 112 may read the page from read data register 138. For instance, in FIG. 1, the arrow labeled [E] represents management processor 112 obtaining data from ERAM 140 via read data register 138. As indicated above with regard to blocks 320 and 340 of FIG. 3, once management processor 112 has retrieved all pages of configuration image 172 and signature 174, management processor 112 may then authenticate configuration image 172.

Figure 5:
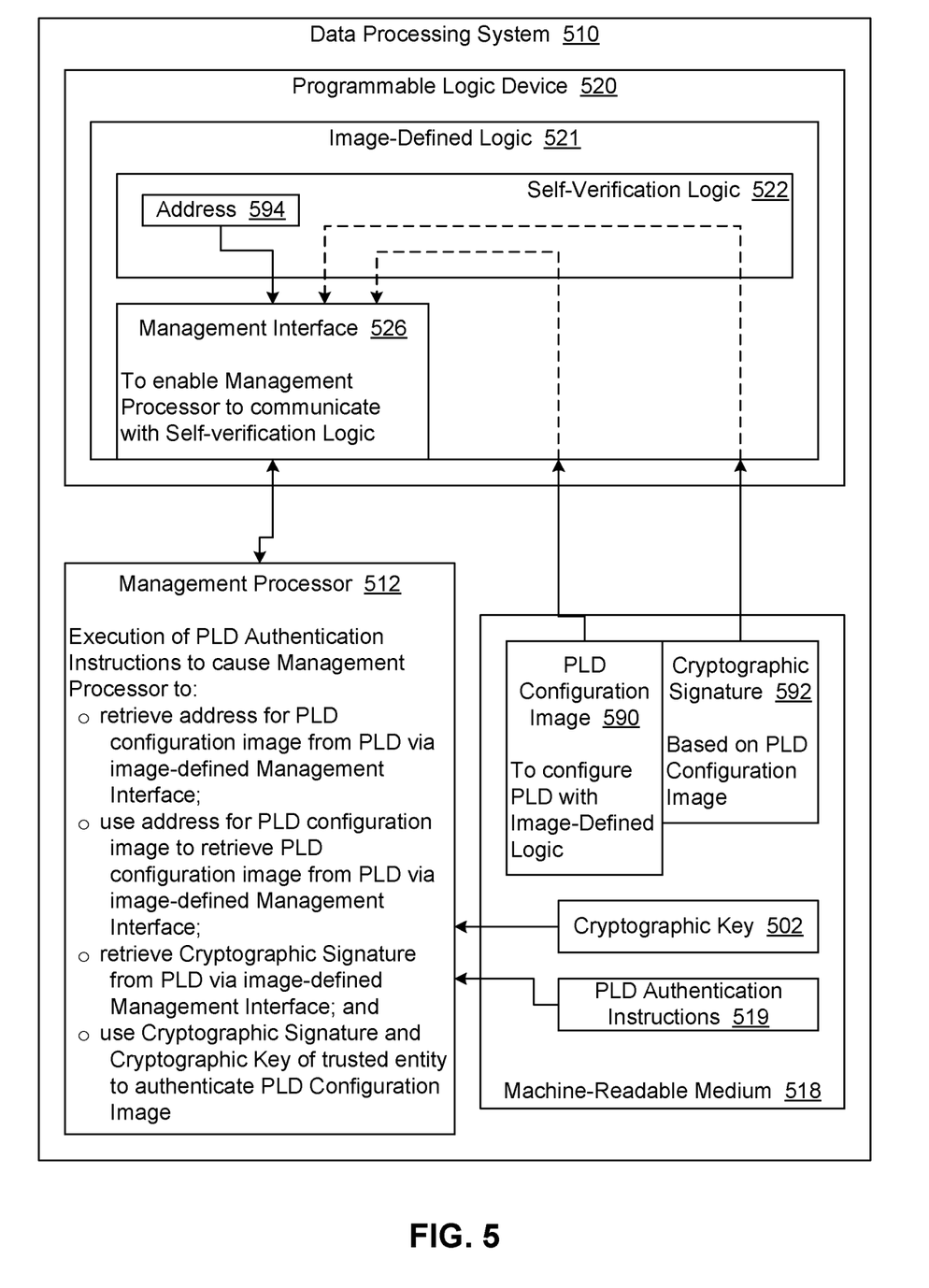
FIG. 5 is a block diagram of a data processing system having technology for PLD verification.

Further Implementations:

FIG. 5 is a block diagram of a data processing system 510 having technology for PLD verification. Data processing system 510 comprises a management processor 512, a PLD 520 coupled to management processor 512, and a non-transitory machine-readable medium (MRM) 518. MRM 518 comprises a PLD configuration image 590 to configure PLD 520 with image-defined logic 521 that comprises self-verification logic 522 and an image-defined management interface 526 to enable management processor 512 to communicate with self-verification logic 522. MRM 518 also comprises a cryptographic signature 592 based on PLD configuration image 590. MRM 518 also comprises PLD authentication instructions 519 which, when executed by management processor 512, cause management processor 512 to retrieve an address for PLD configuration image 590 from PLD 520 via image-defined management interface 526. When executed by management processor 512, PLD authentication instructions 519 also cause management processor 512 to use the address for PLD configuration image 590 to retrieve PLD configuration image 590 from PLD 520 via image-defined management interface 526. When executed by management processor 512, PLD authentication instructions 519 also cause management processor 512 to retrieve cryptographic signature 592 from PLD 520 via image-defined management interface 526. When executed by management processor 512, PLD authentication instructions 519 also cause management processor 512 to use cryptographic signature 592 and a cryptographic key 502 of a trusted entity to authenticate PLD configuration image 590.

In some examples that may be in combination with the foregoing example, the self-verification logic comprises a read status register, and the PLD authentication instructions, upon execution, cause the management processor to retrieve the PLD configuration image from the PLD by retrieving multiple consecutive pages of the PLD configuration image from the PLD via the image-defined management interface. Also, to retrieve each page comprises to send a read request to the self-verification logic, wherein the read request comprises an address for the page to be retrieved; after sending the read request, to monitor the read status register to determine whether read data is ready; and in response to the read status register indicating that read data is ready, to retrieve the page from the self-verification logic.

In some examples that may be in combination with any of the foregoing examples, the self-verification logic comprises a read data register and an FSM to access NVS. Also, self-verification logic causes the PLD to respond to the read request from the management processor by using the FSM to make the page available to the management processor via the read data register.

In some examples that may be in combination with any of the foregoing examples, the self-verification logic comprises ERAM, the read data register is mapped to the ERAM; and the self-verification logic causes the PLD to respond to the read request from the management processor by using the FSM to copy the page from the MRM to the ERAM, to enable the BMC to retrieve the page from the PLD via the read data register.

In some examples that may be in combination with any of the foregoing examples, the PLD and the management processor are coupled via a management bus. Also, the image-defined management interface of the PLD enables the image-defined logic to encrypt PLD data before the PLD data reaches the management bus, and to decrypt data received from the management bus by the PLD. Also, the management processor comprises an interface to the management bus. Also, the interface of the management processor enables the management processor to encrypt management-processor data before the management-processor data reaches the management bus, and to decrypt PLD data received from the management bus.

In some examples that may be in combination with any of the foregoing examples, the management processor comprises a BMC, the PLD comprises an SoC, the MRM comprises a first MRM and a second MRM, the first MRM is coupled to hardened logic in the SoC, the first MRM comprises the PLD configuration image and the cryptographic signature, and the second MRM resides in a location from the group consisting of internal to the BMC and external to the BMC. Also, the second MRM comprises the PLD authentication instructions.

In some examples that may be in combination with any of the foregoing examples, the data processing system further comprises a CPU coupled to the PLD. Also, the image-defined logic of the PLD further comprises functional logic that is accessible to the management processor via the image-defined management interface. Also, the functional logic of the PLD enables the management processor to communicate with the CPU concerning operating characteristics of the CPU.

In some examples that may be in combination with any of the foregoing examples, the data processing system comprises an auxiliary device coupled to the PLD, the image-defined logic of the PLD comprises functional logic that is accessible to the management processor via the image-defined management interface, and the functional logic of the PLD enables the management processor to communicate with the auxiliary device.

In some examples that may be in combination with any of the foregoing examples, the image-defined logic of the PLD comprises auxiliary-device-verification logic that is accessible to the management processor via the image-defined management interface, the auxiliary-device-verification logic to enable the management processor to authenticate data from the auxiliary device.

Figure 6:
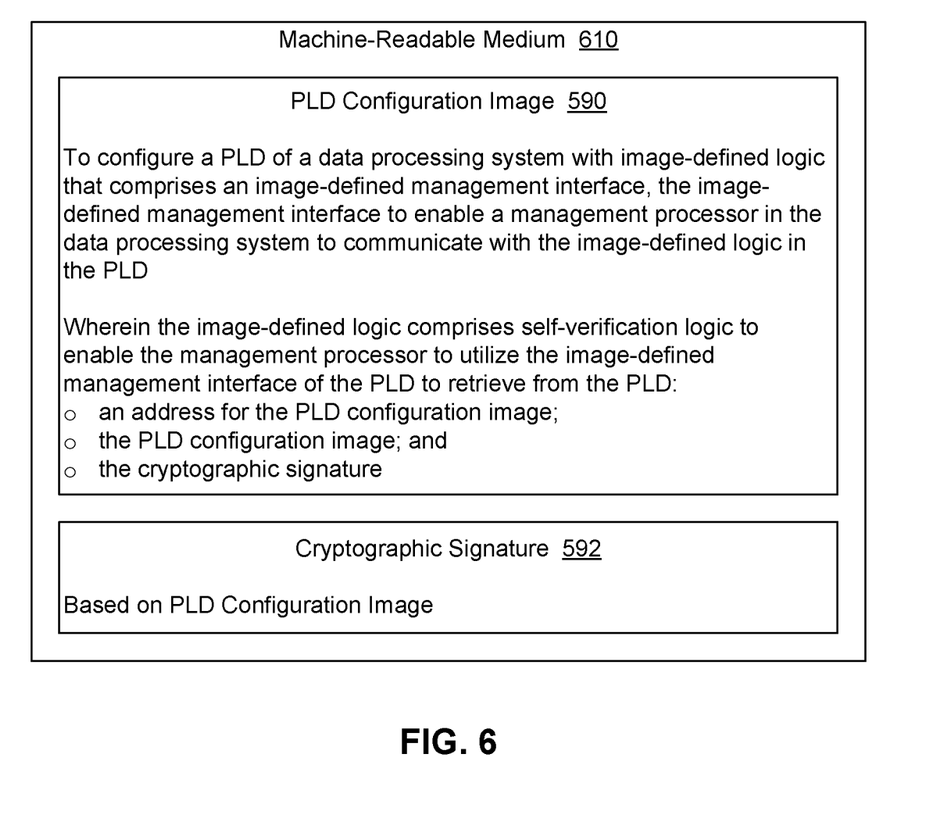
FIG. 6 is a block diagram of a machine-readable medium comprising a PLD configuration image and a cryptographic signature.

FIG. 6 is a block diagram of a non-transitory MRM 610 comprising a PLD configuration image 612 and a cryptographic signature 614. PLD configuration image 612 is to configure a PLD of a data processing system with image-defined logic that comprises an image-defined management interface, the image-defined management interface to enable a management processor in the data processing system to communicate with the image-defined logic in the PLD. Cryptographic signature 614 is based on PLD configuration image 612. The image-defined logic comprises self-verification logic to enable the management processor to utilize the image-defined management interface of the PLD to retrieve data from the PLD. That data comprises an address for PLD configuration image 612, PLD configuration image 612, and cryptographic signature 614.

In some examples that may be in combination with the previous example, the PLD comprises hardened logic coupled to the MRM, the image-defined logic comprises ERAM, and the self-verification logic enables the PLD to obtain a page of the PLD configuration image from the MRM via the hardened logic, and to copy the page to the ERAM in the image-defined logic.

In some examples that may be in combination with any of the foregoing examples, the self-verification logic comprises a set of verification registers to be accessible to the management processor via the image-defined management interface of the PLD, to enable the management processor to retrieve multiple consecutive pages of the PLD configuration image from the PLD. Also, the set of verification registers comprises a read address register to be updated by the management processor with an address for a desired page of the configuration image, a read status register to enable the management processor to determine when read data is ready, and a read data register to enable the management processor to obtain the desired page from the ERAM after the self-verification logic has obtained the desired page via the hardened logic and copied the desired page to the ERAM in the image-defined logic.

In some examples that may be in combination with any of the foregoing examples, the set of verification registers comprises an image address register to provide the management processor with the address for the PLD configuration image, and a signature address register to provide the management processor with an address for the cryptographic signature.

In some examples that may be in combination with any of the foregoing examples, the image-defined management interface enables the PLD to encrypt PLD data before the PLD data reaches a management bus in the data processing system, and to decrypt data received from the management bus by the PLD.

In some examples that may be in combination with any of the foregoing examples, the self-verification logic comprises an FSM to access NVS, and the FSM comprises a command sequence table. Also, in response to receiving a read request from the management processor, wherein the read request specifies a page of the PLD configuration image, the self-verification logic uses the command sequence table to obtain the specified page from hardened logic in the PLD.

Figure 7:
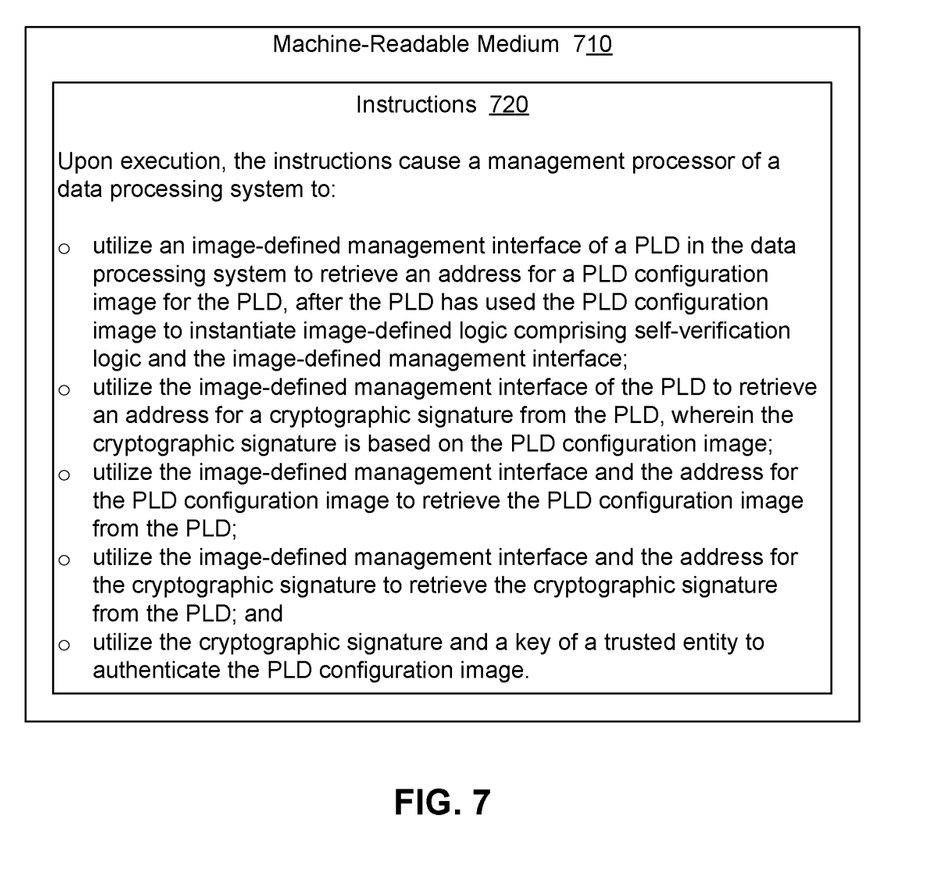
FIG. 7 is a block diagram of a machine-readable medium comprising instructions that upon execution cause a management processor of a data processing system to authenticate a PLD configuration image.

FIG. 7 is a block diagram of a non-transitory MRM 710 comprising instructions 720 that upon execution cause a management processor of a data processing system to authenticate a PLD configuration image for a PLD in the data processing system. In particular, instructions 720 cause the management processor to utilize an image-defined management interface of the PLD to retrieve an address for a PLD configuration image for the PLD, after the PLD has used the PLD configuration image to instantiate image-defined logic comprising self-verification logic and the image-defined management interface. Upon execution, instructions 720 also cause the management processor to utilize the image-defined management interface of the PLD to retrieve an address for a cryptographic signature from the PLD, wherein the cryptographic signature is based on the PLD configuration image. Upon execution, instructions 720 also cause the management processor to utilize the image-defined management interface and the address for the PLD configuration image to retrieve the PLD configuration image from the PLD. Upon execution, instructions 720 also cause the management processor to utilize the image-defined management interface and the address for the cryptographic signature to retrieve the cryptographic signature from the PLD. Upon execution, instructions 720 also cause the management processor to utilize the cryptographic signature and a cryptographic key of a trusted entity to authenticate the PLD configuration image.

In some examples that may be in combination with the previous example, the instructions upon execution cause the management processor to authenticate the PLD configuration image during a boot process of the data processing system.

In some examples that may be in combination with any of the foregoing examples, the instructions upon execution cause the management processor to prevent a central processing unit of the data processing system from entering a working state until the PLD configuration image has been authenticated.

In some examples that may be in combination with any of the foregoing examples, the instructions upon execution cause the management processor to periodically revalidate the PLD configuration image during runtime, after the boot process of the data processing system has competed.

In some examples that may be in combination with any of the foregoing examples, the instructions upon execution cause the management processor to encrypt management-processor data before the management-processor data reaches a management bus in the data processing system, and to decrypt PLD data received from the management bus.

While the present disclosure has been described with respect to a limited number of implementations or examples, those skilled in the art, having the benefit of this disclosure, will appreciate numerous modifications and variations therefrom. It is intended that the appended claims cover all such modifications and variations.

What is claimed is:

1. A data processing system, comprising:
a management processor;
a programmable logic device (PLD) coupled to the management processor;
a non-transitory machine-readable medium (MRM);
a PLD configuration image in the MRM, the PLD configuration image to configure the PLD with image-defined logic that comprises self-verification logic and an image-defined management interface to enable the management processor to communicate with the self-verification logic in the PLD;
a cryptographic signature in the MRM, the cryptographic signature based on the PLD configuration image; and
PLD authentication instructions in the MRM, wherein the PLD authentication instructions, when executed by the management processor, cause the management processor to:
retrieve an address for the PLD configuration image from the PLD via the image-defined management interface of the PLD;
use the address for the PLD configuration image to retrieve the PLD configuration image from the PLD via the image-defined management interface of the PLD;
retrieve the cryptographic signature from the PLD via the image-defined management interface of the PLD; and
use the cryptographic signature and a cryptographic key of a trusted entity to authenticate the PLD configuration image, wherein
the self-verification logic of the PLD comprises a read status register; and
the PLD authentication instructions, when executed by the management processor, cause the management processor to retrieve the PLD configuration image from the PLD by retrieving multiple consecutive pages of the PLD configuration image from the PLD via the image-defined management interface, wherein to retrieve each page comprises to:
send a read request to the self-verification logic of the PLD, wherein the read request comprises an address for the page to be retrieved;
after sending the read request, monitor the read status register to determine whether read data is ready; and
in response to the read status register indicating that read data is ready, retrieve the page from the self-verification logic of the PLD.

2. The data processing system of claim 1, wherein:
the self-verification logic comprises a read data register and a finite-state machine (FSM) to access non-volatile storage; and
the self-verification logic causes the PLD to respond to the read request from the management processor by using the FSM to make the page available to the management processor via the read data register.

3. The data processing system of claim 2, wherein:
the self-verification logic comprises embedded random access memory (ERAM);
the read data register is mapped to the ERAM; and
the self-verification logic causes the PLD to respond to the read request from the management processor by using the FSM to copy the page from the MRM to the ERAM, to enable the BMC to retrieve the page from the PLD via the read data register.

4. A data processing system, comprising:
a management processor;
a programmable logic device (PLD) coupled to the management processor;
a non-transitory machine-readable medium (MRM);
a PLD configuration image in the MRM, the PLD configuration image to configure the PLD with image-defined logic that comprises self-verification logic and an image-defined management interface to enable the management processor to communicate with the self-verification logic in the PLD;
a cryptographic signature in the MRM, the cryptographic signature based on the PLD configuration image; and
PLD authentication instructions in the MRM, wherein the PLD authentication instructions, when executed by the management processor, cause the management processor to:
retrieve an address for the PLD configuration image from the PLD via the image-defined management interface of the PLD;
use the address for the PLD configuration image to retrieve the PLD configuration image from the PLD via the image-defined management interface of the PLD:
retrieve the cryptographic signature from the PLD via the image-defined management interface of the PLD; and
use the cryptographic signature and a cryptographic key of a trusted entity to authenticate the PLD configuration image,
the PLD and the management processor are coupled via a management bus;
the image-defined management interface of the PLD enables the image-defined logic to:
encrypt PLD data before the PLD data reaches the management bus; and
decrypt data received from the management bus by the PLD;
the management processor comprises an interface to the management bus; and
the interface of the management processor enables the management processor to:
encrypt management-processor data before the management-processor data reaches the management bus; and
decrypt PLD data received from the management bus.

5. A data processing system, comprising:
a management processor;
a programmable logic device (PLD) coupled to the management processor;
a non-transitory machine-readable medium (MRM);
a PLD configuration image in the MRM, the PLD configuration image to configure the PLD with image-defined logic that comprises self-verification logic and an image-defined management interface to enable the management processor to communicate with the self-verification logic in the PLD;
a cryptographic signature in the MRM, the cryptographic signature based on the PLD configuration image; and
PLD authentication instructions in the MRM, wherein the PLD authentication instructions, when executed by the management processor, cause the management processor to:
retrieve an address for the PLD configuration image from the PLD via the image-defined management interface of the PLD;

use the address for the PLD configuration image to retrieve the PLD configuration image from the PLD via the image-defined management interface of the PLD;
retrieve the cryptographic signature from the PLD via the image-defined management interface of the PLD; and
use the cryptographic signature and a cryptographic key of a trusted entity to authenticate the PLD configuration image, wherein:

the management processor comprises a baseboard management controller (BMC);
the PLD comprises a system-on-a-chip (SoC);
the MRM comprises a first MRM and a second MRM;
the first MRM is coupled to hardened logic in the SoC;
the first MRM comprises the PLD configuration image and the cryptographic signature;
the second MRM resides in a location from the group consisting of:
 internal to the BMC; and
 external to the BMC; and
the second MRM comprises the PLD authentication instructions.

6. The data processing system of claim 5, wherein:
the data processing system further comprises a central processing unit (CPU) coupled to the PLD; and
the image-defined logic of the PLD further comprises functional logic that is accessible to the management processor via the image-defined management interface; and
the functional logic of the PLD enables the management processor to communicate with the CPU concerning operating characteristics of the CPU.

7. The data processing system of claim 5, wherein:
the data processing system comprises an auxiliary device coupled to the PLD;
the image-defined logic of the PLD comprises functional logic that is accessible to the management processor via the image-defined management interface; and
the functional logic of the PLD enables the management processor to communicate with the auxiliary device.

8. The data processing system of claim 7, wherein:
the image-defined logic of the PLD comprises auxiliary-device-verification logic that is accessible to the management processor via the image-defined management interface, the auxiliary-device-verification logic to enable the management processor to authenticate data from the auxiliary device.

9. A non-transitory machine-readable medium (MRM) comprising:
a programmable logic device (PLD) configuration image to configure a PLD of a data processing system with image-defined logic that comprises an image-defined management interface, the image-defined management interface to enable a management processor in the data processing system to communicate with the image-defined logic in the PLD; and
a cryptographic signature that is based on the PLD configuration image;
wherein the image-defined logic comprises self-verification logic to enable the management processor to utilize the image-defined management interface of the PLD to retrieve from the PLD:
an address for the PLD configuration image;
the PLD configuration image; and
the cryptographic signature, wherein:
the PLD comprises hardened logic coupled to the MRM;
the image-defined logic comprises embedded random access memory (ERAM); and
the self-verification logic enables the PLD to:
 obtain a page of the PLD configuration image from the MRM via the hardened logic; and
 copy the page to the ERAM in the image-defined logic, and wherein
the self-verification logic comprises a set of verification registers to be accessible to the management processor via the image-defined management interface of the PLD, to enable the management processor to retrieve multiple consecutive pages of the PLD configuration image from the PLD; and
the set of verification registers comprises:
 a read address register to be updated by the management processor with an address for a desired page of the configuration image;
 a read status register to enable the management processor to determine when read data is ready; and
 a read data register to enable the management processor to obtain the desired page from the ERAM after the self-verification logic has obtained the desired page via the hardened logic and copied the desired page to the ERAM in the image-defined logic.

10. The MRM of claim 9, wherein the set of verification registers comprises:
an image address register to provide the management processor with the address for the PLD configuration image; and
a signature address register to provide the management processor with an address for the cryptographic signature.

11. The MRM of claim 9, wherein the image-defined management interface enables the PLD to:
encrypt PLD data before the PLD data reaches a management bus in the data processing system; and
decrypt data received from the management bus by the PLD.

12. The MRM of claim 9, wherein:
the self-verification logic comprises a finite-state machine (FSM) to access non-volatile storage, and the FSM comprises a command sequence table; and
in response to receiving a read request from the management processor, wherein the read request specifies a page of the PLD configuration image, the self-verification logic uses the command sequence table to obtain the specified page from hardened logic in the PLD.

* * * * *